United States Patent
Marasli et al.

(10) Patent No.: US 7,599,298 B2
(45) Date of Patent: Oct. 6, 2009

(54) METHOD AND APPARATUS FOR SELECTING A PREFERRED LSP PATH FROM A SET OF EQUAL COST PATHS

(75) Inventors: Rahmi Marasli, Mars, PA (US); Sanjaya Choudhury, Allison Park, PA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 782 days.

(21) Appl. No.: 10/835,728

(22) Filed: Apr. 30, 2004

(65) Prior Publication Data
US 2005/0243724 A1   Nov. 3, 2005

(51) Int. Cl.
*G01L 1/00* (2006.01)
(52) U.S. Cl. .................. 370/238; 370/395.41; 370/400; 709/241
(58) Field of Classification Search .......... 370/400, 370/395.41, 468, 235, 238, 351; 709/238, 709/241
See application file for complete search history.

(56) References Cited

U.S. PATENT DOCUMENTS

| | | | |
|---|---|---|---|
| 6,363,319 B1 * | 3/2002 | Hsu | 701/202 |
| 6,724,722 B1 * | 4/2004 | Wang et al. | 370/229 |
| 6,778,496 B1 * | 8/2004 | Meempat et al. | 370/230 |
| 6,904,017 B1 * | 6/2005 | Meempat et al. | 370/238 |
| 6,912,587 B1 * | 6/2005 | O'Neil | 709/232 |
| 2004/0004938 A1 * | 1/2004 | Buddhikot et al. | 370/238 |
| 2004/0184483 A1 * | 9/2004 | Okamura et al. | 370/477 |

* cited by examiner

*Primary Examiner*—Ayaz R Sheikh
*Assistant Examiner*—Mounir Moutaouakil

(57) ABSTRACT

A telecommunications system includes an MPLS network. The system includes a source node in communication with the network. The system includes a destination node in communication with the network and with the source node through a plurality of different paths. Each path of which has a residual bandwidth at a given time. The source node forming a connection with the destination node at the given time across the path of the different paths as a function of residual bandwidth. A method for selecting a preferred LSP path from a set of equal cost paths. A method for sending packets in a telecommunications network. A software program for a management station or a switch.

3 Claims, 1 Drawing Sheet

METHOD AND APPARATUS FOR SELECTING A PREFERRED LSP PATH FROM A SET OF EQUAL COST PATHS

FIELD OF THE INVENTION

The present invention relates to choosing a path for a set of equal cost paths to form a connection between a source node and a destination node of an MPLS network. More specifically, the present invention relates to choosing a path for a set of equal cost paths to form a connection between a source node and a destination node of an MPLS network as a function of residual bandwidth with respect to the paths.

BACKGROUND OF THE INVENTION

Arbitrarily selecting a path to setup a LSP from a set of equal cost paths computed by Constraint Based Routing, may lead to inefficient usage of bandwidth resource in the MPLS domain. This can lead to rejection of LSP setup requests that could have been accepted otherwise. The present invention allows an originating/source node to select an LSP path more intelligently.

SUMMARY OF THE INVENTION

The present invention pertains to a telecommunications system. The system comprises an MPLS network. The system comprises a source node in communication with the network. The system comprises a destination node in communication with the network and with the source node through a plurality of different paths. Each path of which has a residual bandwidth at a given time. The source node forming a connection with the destination node at the given time across the path of the different paths as a function of residual bandwidth.

The present invention pertains to a method for selecting a preferred LSP path from a set of equal cost paths. The method comprises the steps of defining a set of equal cost paths from a source node to a destination node in an MPLS network. There is the step of defining a path residual bandwidth as a sum of residual bandwidths for constituent links between the source node and the destination node. There is the step of defining a set of residual bandwidths of all the equal cost paths from the source node to the destination node. There is the step of selecting a preferred path as a path with minimum path residual bandwidth from the set of residual bandwidths.

The present invention pertains to a method for sending packets in a telecommunications network. The method comprises the steps of defining a set of equal cost paths from a source node to a destination node in an MPLS network. There is the step of defining a path residual bandwidth as a sum of residual bandwidths for constituent links between the source node and the destination node. There is the step of defining a set of residual bandwidths of all the equal cost paths from the source node to the destination node. There is the step of selecting a preferred path as a path with minimum path residual bandwidth from the set of residual bandwidths. There is the step of sending the packets from the source node to the destination node along the preferred path.

The present invention pertains to a software program for a management station or a switch comprising the steps of defining a set of equal cost paths from a source node to a destination node in an MPLS network. There is the step of defining a path residual bandwidth as a sum of residual bandwidths for constituent links between the source node and the destination node. There is the step of defining a set of residual bandwidths of all the equal cost paths from the source node to the destination node. There is the step of selecting a preferred path as a path with minimum path residual bandwidth from the set of residual bandwidths. There is the step of sending the packets from the source node to the destination node along the preferred path.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
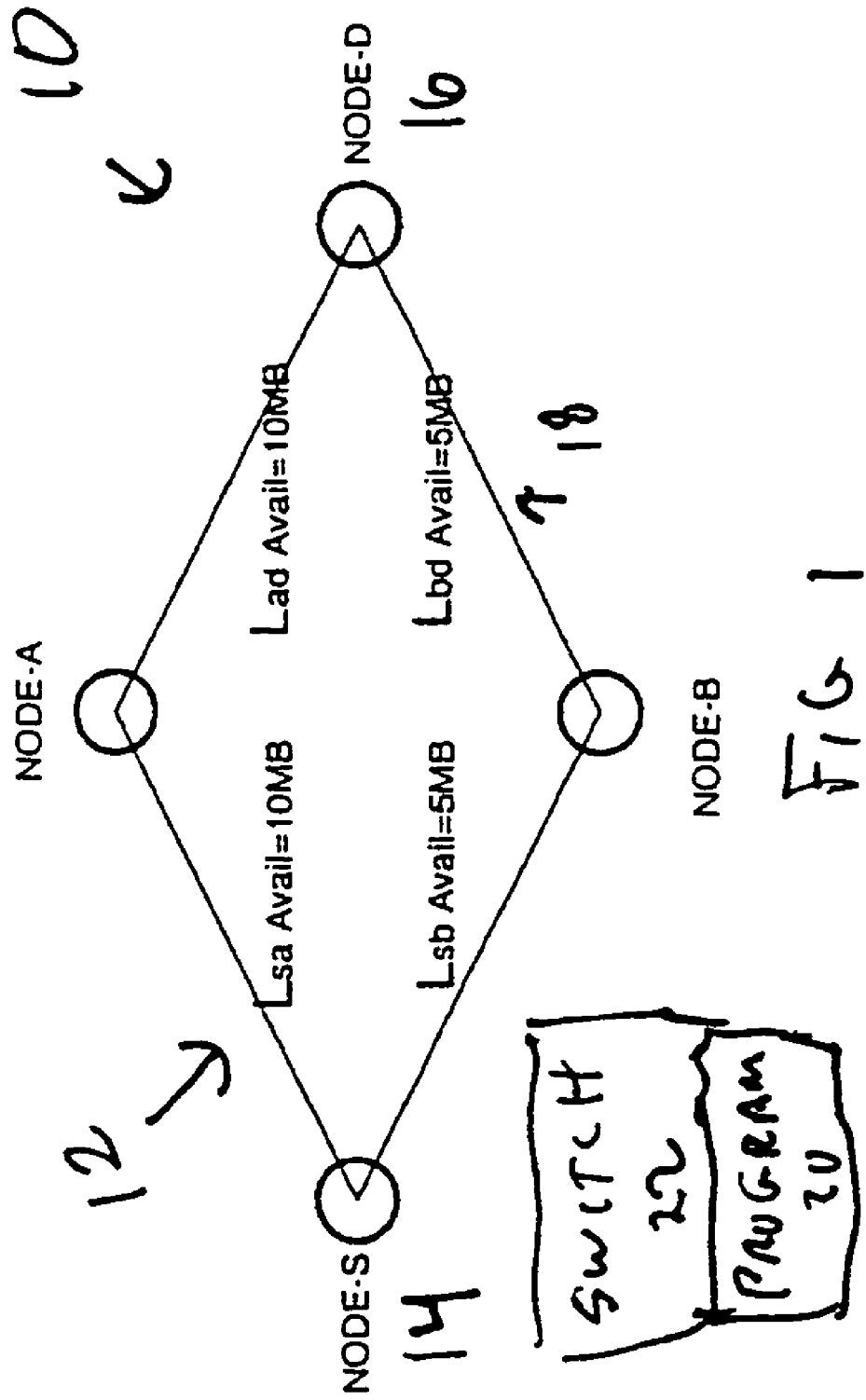
FIG. 1 is a schematic representation of the present invention.

Referring now to the drawings wherein like reference numerals refer to similar or identical parts throughout the several views, and more specifically to FIG. 1 thereof, there is shown a telecommunications system 10. The system 10 comprises an MPLS network 12. The system 10 comprises a source node 14 in communication with the network 12. The system 10 comprises a destination node 16 in communication with the network 12 and with the source node 14 through a plurality of different paths 18. Each path 18 of which has a residual bandwidth at a given time. The source node 14 forming a connection with the destination node 16 at the given time across the path 18 of the different paths as a function of residual bandwidth.

Preferably, the path 18 has a minimum residual bandwidth of the plurality of different paths. The plurality of paths are preferably a set of equal cost paths. Preferably, the path 18 is an LSP path.

The present invention pertains to a method for selecting a preferred LSP path 18 from a set of equal cost paths. The method comprises the steps of defining a set of equal cost paths from a source node 14 to a destination node 16 in an MPLS network 12. There is the step of defining a path residual bandwidth as a sum of residual bandwidths for constituent links between the source node 14 and the destination node 16. There is the step of defining a set of residual bandwidths of all the equal cost paths from the source node 14 to the destination node 16. There is the step of selecting a preferred path as a path with minimum path residual bandwidth from the set of residual bandwidths.

The present invention pertains to a method for sending packets in a telecommunications network 12. The method comprises the steps of defining a set of equal cost paths from a source node 14 to a destination node 16 in an MPLS network 12. There is the step of defining a path residual bandwidth as a sum of residual bandwidths for constituent links between the source node 14 and the destination node 16. There is the step of defining a set of residual bandwidths of all the equal cost paths from the source node 14 to the destination node 16. There is the step of selecting a preferred path as a path with minimum path residual bandwidth from the set of residual bandwidths. There is the step of sending the packets from the source node 14 to the destination node 16 along the preferred path.

The present invention pertains to a software program 20 for a management station or a switch 22 comprising the steps of defining a set of equal cost paths from a source node 14 to a destination node 16 in an MPLS network 12. There is the step of defining a path residual bandwidth as a sum of residual bandwidths for constituent links between the source node 14 and the destination node 16. There is the step of defining a set of residual bandwidths of all the equal cost paths from the source node 14 to the destination node 16. There is the step of selecting a preferred path as a path with minimum path residual bandwidth from the set of residual bandwidths. There is the step of sending the packets from the source node 14 to the destination node 16 along the preferred path.

In the operation of the invention, Traffic Engineering is used by providers to extract more value out of their existing network 12, by optimizing the resources. The technique described herein is one such Traffic Engineering technique to improve the bandwidth resource usage while selecting a preferred path from a set of candidate paths.

The technique suggests that while selecting a path from multiple equal cost paths (ECMPs), the one that is chosen fits the LSP bandwidth profile best. This can be archived by selecting the path with the "minimal residual bandwidth". Where the "residual bandwidth" of a path is defined as the sum of residual bandwidth for each of its constituent links. In this context, the residual bandwidth of a link is defined as the difference between the available link bandwidth and LSP bandwidth. In mathematical notation:

1. Define Set of Equal Cost Paths from source S to Destination D.

$$P=\langle Path^i_{SD}|i=0\ldots n\rangle$$

where n=number of equal cost paths between the source node S and destination node D.

2. Define Path Residual Bandwidth (PathRes) as the sum of residual bandwidths for constituent links.

$$Path\ Res_{p\varepsilon P} = \sum_{l\varepsilon p}(LinkBw_l - LSPBw)$$

where $LinkBw_1$=available LinkBw for Link 1, and LSPBw=bandwidth being requested by the LSP.

3. Define Set of Residual Bandwidth of all the equal cost Paths from S to D.

$$R\langle Path\ Re\ s(Path^i_{SD})|Path^i_{SD}\varepsilon P\rangle$$

4. Preferred path is the path with minimum path residual bandwidth (PathRes).

$$PreferredPath_{SD}=MIN(R)$$

If there are multiple paths with the minimum residual bandwidth, choose one of them.

The above-mentioned technique improves the bandwidth usage on a network 12 wide basis. However, if the aim is to improve the bandwidth usage between a particular source and destination, the following variation of the technique should be used:

Preferred path is the path which contains a link with minimum "Link Residual Bandwidth" among all the Links in all the Paths.

where LinkResidual$Bw$=(Link$Bw$–LSP$Bw$)

This technique of selecting a preferred path from multiple equal cost paths can also be applied for mutually disjoint paths.

Constraint Based Routing algorithms used by MPLS-TE allows the originating node to compute paths that satisfy all the necessary constraints requested by a LSP. Because of network 12 topology, there may exist multiple such paths of equal cost, between a pair of source and destination nodes 16. When there is no need to establish multiple LSP between the nodes, the originating switch/router typically chooses one of these equal cost paths. Arbitrarily choosing one may result in a sub-optimal bandwidth usage. FIG. 1 illustrates one such scenario.

In FIG. 1 topology, there are two paths from source to destination:

(i) $\{L_{sa}, L_{ad}\}$ and
(ii) $\{L_{sb}, L_{bd}\}$

Assume that both of these paths satisfy all the constraints of the 5 MB LSP that are trying to be set up and that they are of equal cost. If the LSR arbitrarily chooses the path $\{L_{sa}, L_{ad}\}$, a subsequent request to establish a second 10 MB LSP from Node-S to Node D will be rejected. If the LSR had chosen the path {Lsb, Lbd} instead, the second LSP setup request would have succeeded.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system comprising:
an MPLS network;
a source node in communication with the network; and
a destination node in communication with the network and with the source node through a plurality of different equal cost LSP paths, each path of which has a residual bandwidth at a given time, the source node forming a connection with the destination node at the given time across the path of the different paths as a function of residual bandwidth, the path has a minimum residual bandwidth of the plurality of different paths, where the residual bandwidth of the path is defined as a sum of residual bandwidth for each of its constituent links, and the residual bandwidth of a link is defined as a difference between available link bandwidth and LSP bandwidth.

2. A system as described in claim 1 wherein the plurality of paths are a set of equal cost paths.

3. A software program embodied on a computer readable medium for a management station or a switch comprising the steps of:
defining a set of equal cost LSP paths from a source node to a destination node in an MPLS network;
defining a path residual bandwidth as a sum of residual bandwidths for constituent links between the source node and the destination node, and the residual bandwidth of a link is defined as a difference between available link bandwidth and LSP bandwidth;
defining a set of residual bandwidths of all the equal cost paths from the source node to the destination node; and
selecting a preferred path as a path with minimum path residual bandwidth from the set of residual bandwidths.

* * * * *

UNITED STATES PATENT AND TRADEMARK OFFICE
CERTIFICATE OF CORRECTION

PATENT NO. : 7,599,298 B2
APPLICATION NO. : 10/835728
DATED : October 6, 2009
INVENTOR(S) : Marasli et al.

It is certified that error appears in the above-identified patent and that said Letters Patent is hereby corrected as shown below:

In Column 2, Line 7, delete "DRAWINGS" and insert -- DRAWING --, therefor.

In Column 2, Line 9, delete "drawings," and insert -- drawing, --, therefor.

In Column 3, Line 34, delete "LinkBw₁" and insert -- LinkBw$_l$ --, therefor.

In Column 3, Line 34, delete "1," and insert -- l, --, therefor.

In Column 3, Line 39, delete " $R\langle \text{Path } Re\ s(\text{Path}^i_{SD}) | \text{Path}^i_{SD}\ \epsilon P \rangle$ ," and insert -- $R\langle Path\ \text{Re}\ s(Path^i_{SD}) | Path^i_{SD}\ \varepsilon\ P \rangle$ --, therefor.

In Column 4, Line 18, delete "{Lsb, Lbd}" and insert -- {L$_{sb}$, L$_{bd}$} --, therefor.

Signed and Sealed this

Nineteenth Day of January, 2010

David J. Kappos
*Director of the United States Patent and Trademark Office*